No. 645,221. Patented Mar. 13, 1900.
S. J. TUTTHILL.
WATER WHEEL.
(Application filed July 1, 1899.)
(No Model.)
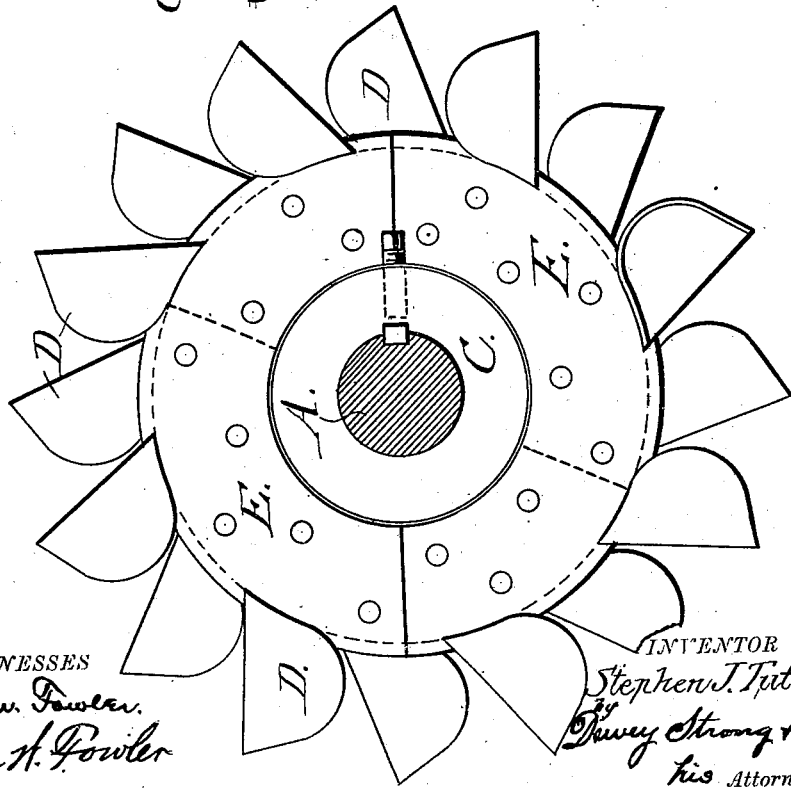

UNITED STATES PATENT OFFICE.

STEPHEN J. TUTTHILL, OF OAKLAND, CALIFORNIA, ASSIGNOR TO THE TUTTHILL WATER WHEEL COMPANY, OF SAN FRANCISCO, CALIFORNIA.

WATER-WHEEL.

SPECIFICATION forming part of Letters Patent No. 645,221, dated March 13, 1900.

Application filed July 1, 1899. Serial No. 722,675. (No model.)

*To all whom it may concern:*

Be it known that I, STEPHEN J. TUTTHILL, a citizen of the United States, residing in Oakland, county of Alameda, State of California, have invented an Improvement in Water-Wheels; and I hereby declare the following to be a full, clear, and exact description of the same.

My invention relates to improvements in water-wheels, particularly of that class in which buckets are disposed around the periphery and adapted to receive water delivered into them by a nozzle under a high head or pressure, so that the wheel is driven by the momentum of this combined velocity and pressure.

The invention consists of the parts and the constructions and combinations of parts hereinafter described and claimed.

Figure 1 is a side elevation of the wheel. Fig. 2 is a longitudinal section of the same. Fig. 3 shows a modification where one set of buckets is cast with the rim. Fig. 4 is a detail in perspective, showing the divided disk and hubs or sleeves.

In the construction of this class of wheels it has been customary to bolt the buckets separately upon the rim of the wheel; but in many places where this class of wheels is employed the water used contains so much gravel, sand, or gritty material, which is carried by the water, that its impact under the high head and great velocity will soon wear out the buckets and will particularly cut off the nuts or bolts by which the buckets are secured, so that they fly off the wheel. If the buckets are cast or otherwise secured around the rim of the wheel, the whole wheel must be renewed when any number of the buckets are worn out. The impact of this water is also very deleterious to the shaft itself, and the wear is so great that if the shaft is not protected it also would have to be renewed in a comparatively short time.

It is the object of my invention to cast a plurality of buckets upon segments which are fitted to the periphery of the wheel or disk and with the ends of the segments abutting, so as to make practically a continuous plate on each side, whereby the strain upon any particular securing-bolt is equally distributed throughout the segments and the securing-bolts thereof, and to so extend the hub of said wheel or disk that it will cover and protect that portion of the shaft upon each side of the wheel which is in line with and liable to be acted upon by the jet of water from the nozzle and to form the disk and its hub in a plurality of parts, so that when worn out any of these parts may be removed and others substituted without destroying the whole structure.

As here shown, A is the shaft upon which the wheel is mounted. This wheel consists of disks B, bored to fit the shaft and having the hubs or sleeves C extending to a considerable distance upon each side, so as to inclose and protect that portion of the shaft adjacent to the wheel. These hubs or sleeves are secured together and clamped upon the wheel-shaft by means of bolts and nuts 10 or in any suitable or desired manner and may be removed either individually or together by disengaging them therefrom. The periphery of the disk forms a flange, and the buckets D are cast upon segments E of any desired length. These segments may be one-half or other portion of a circle, those upon the left side carrying one half of the buckets D and those upon the right side carrying the other half, which when the wheel is put together stand between those of the left half. The segments are preferably bolted upon opposite sides of the wheel-rim, so that the meeting ends of the segments on one side do not stand opposite to those on the other sides, and the said ends of the segments on each side abut squarely against each other, so as to make substantially a continuous plate, whereby the strain brought upon any particular securing-bolt is communicated to and equally distributed throughout the segments and the securing-bolts thereof. The segments are also shown as having inwardly-extending flanges e, which inclose and protect the periphery of the flange B.

The buckets are so disposed that the inner edges of the right and left buckets overlap, so that a jet of water delivered from the nozzle in the line with the center of the wheel will alternately pass into the buckets of one side and the buckets of the other side, and these buckets have the interior so curved that the water received therein from the nozzle is diverted outwardly and in a curve which is designed to utilize, first, the direct impact of the water, and, secondly, the reactionary force of the water as it escapes from the bucket, and at the same time to discharge the water outwardly and away from the wheel, so that it will not strike any portion of the wheel or the buckets to impede its revolution.

The flanges to which the buckets are cast are adapted to fit upon the rim of the wheel and are secured thereto by bolts; but these bolts are entirely protected from the impact of the stream of water, because they are beneath the buckets, which, overlapping, as shown, prevent the water from striking the bolts.

Whenever any section of a hub or buckets thus constructed is destroyed by the attrition of the sharp sand or material carried by the water, it can be easily removed and a new section supplied without great loss of time and the serious expense of replacing the whole structure.

In Fig. 3 I show each alternate bucket cast with the disk or rim B, and the intermediate buckets are cast with a short section of flange D', adapted to be bolted to the disk B intermediate between those which are cast therewith. Thus every alternate bucket around the periphery of the wheel is cast therewith and the intermediate alternate buckets are independent and movable therefrom.

Having thus described my invention, what I claim as new, and desire to secure by Letters Patent, is—

1. A water-wheel consisting of a disk and hub and a shaft to which they are secured, segments bolted flatwise against the sides of the disk and each formed with a plurality of buckets said segments having their ends abutting directly against each other to make substantially a continuous plate whereby the strain upon any securing-bolt is equally distributed throughout the segments and the securing-bolts thereof.

2. A water-wheel consisting of a disk and hub and a shaft to which they are secured, vertically-disposed segments bolted flatwise against the vertical sides of the disk and having radially-disposed ends abutting directly against each other to form substantially a continuous plate on each side of the disk whereby the strain upon the bolts is equally distributed said segments each formed integral with a plurality of buckets with the buckets on one side of the disk occupying spaces between those on the other side of the disk.

3. In a water-wheel, a shaft, a divided disk and divided hub fitted thereto said hub extending outwardly along the line of the shaft, vertically-disposed segments fitted flatwise against the vertical sides of the disk and each formed with a plurality of buckets said segments occupying substantially the space between the rim of the disk and the hub with the ends of one segment abutting directly against the ends of a companion segment whereby each segment directly resists the strain brought upon the other, and the strain upon the securing-bolts is equally distributed.

4. In a water-wheel, the combination of a shaft, a hub and vertically-disposed disk fitted to said shaft, vertically-disposed segments bolted flatwise against the sides of the disk and occupying the space between the periphery of the disk and the hub, each of said segments formed with a plurality of buckets and each having inwardly-extending flanges adapted to embrace and protect the periphery of the disk.

In witness whereof I have hereunto set my hand.

STEPHEN J. TUTTHILL.

Witnesses:
GEO. H. STRONG,
S. H. NOURSE.